(12) United States Patent
Reed et al.

(10) Patent No.: US 7,144,148 B2
(45) Date of Patent: Dec. 5, 2006

(54) CONTINUOUS MANUFACTURE OF HIGH INTERNAL PHASE RATIO EMULSIONS USING RELATIVELY LOW-SHEAR AND LOW-TEMPERATURE PROCESSING STEPS

(75) Inventors: Ted Alan Reed, Marietta, OH (US); Eric Arthur Warren, Vincent, OH (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 10/871,987

(22) Filed: Jun. 18, 2004

(65) Prior Publication Data

US 2005/0282914 A1 Dec. 22, 2005

(51) Int. Cl.
*B01F 15/04* (2006.01)

(52) U.S. Cl. .............................. 366/162.1; 366/177.1; 366/181.8; 366/184; 366/187; 366/192; 366/241; 366/244; 366/136; 516/53; 516/55; 516/67

(58) Field of Classification Search ...................... None
See application file for complete search history.

(56) References Cited

U.S. PATENT DOCUMENTS

| | | | |
|---|---|---|---|
| 3,684,251 A * | 8/1972 | Bowling | .................. 366/181.8 |
| 4,472,215 A | 9/1984 | Binët et al. | |
| 4,844,620 A | 7/1989 | Lissant et al. | |
| 4,934,398 A | 6/1990 | Chirinos et al. | |
| 5,000,861 A | 3/1991 | Yang | |
| 5,147,134 A * | 9/1992 | Bradley et al. | ........... 366/177.1 |
| 5,234,495 A | 8/1993 | Breneman et al. | |
| 5,250,576 A | 10/1993 | DesMarais et al. | |
| 5,302,657 A * | 4/1994 | Huhn et al. | .................. 524/588 |
| 5,338,352 A | 8/1994 | Breneman et al. | |
| 5,391,400 A | 2/1995 | Yang | |
| 5,563,189 A | 10/1996 | Hosokawa et al. | |
| 5,665,796 A | 9/1997 | Hosokawa et al. | |
| 5,827,909 A | 10/1998 | DesMarais | |
| 6,685,952 B1 * | 2/2004 | Ma et al. | ..................... 424/401 |
| 6,699,488 B1 * | 3/2004 | Deckner et al. | ............ 424/401 |

FOREIGN PATENT DOCUMENTS

EP 1072629 1/2001

\* cited by examiner

*Primary Examiner*—Marc S. Zimmer

(57) ABSTRACT

Methods for continuously producing HIPR silicone in water emulsions are disclosed. The methods use low shear devices, and thus the temperature of the emulsions is kept low, while enhanced particle size and viscosity are obtained.

60 Claims, 4 Drawing Sheets

Recycle Grease Loop Process (RGL)

RGL Process with Secondary Static Shearing

RGL Process with Rotor-Stator for Secondary Shearing

RGL Process with Pressure-Boosting Pump for Secondary Static Shearing

Pilot Unit - RGL with Pressure-Boosting Pump for Secondary Static Shearing

Continuous Stirred Tank Process (CST)

Staged Static Mixer Process (SSM)

CONTINUOUS MANUFACTURE OF HIGH INTERNAL PHASE RATIO EMULSIONS USING RELATIVELY LOW-SHEAR AND LOW-TEMPERATURE PROCESSING STEPS

BACKGROUND OF THE INVENTION

1. Field of the Invention

The present invention is directed to methods for making emulsions having a high ratio of internal (dispersed) phase to external (continuous) phase. More specifically, in accordance with the methods of the present invention, silicone in water emulsions are continuously made with a low probability of phase inversion.

2. Description of Related Art

An emulsion is a dispersion of one liquid phase in another substantially immiscible continuous liquid phase. As these dispersions have a tendency to separate, stabilizing agents, i.e., emulsifiers, are added to maintain the emulsion. Emulsions having a high ratio of dispersed phase to continuous phase are known in the art as High Internal Phase Ratio Emulsions ("HIPRE" "HIPR emulsions" or "HIPREs") or High Internal Phase Emulsions ("HIPE" or "HIPEs"). These emulsions can be either oil-in-water or water-in-oil emulsions and typically contain more than 70% internal, or dispersed, phase.

HIPR oil-in-water emulsions are normally prepared by dispersing oil into the continuous phase under conditions capable of producing emulsions wherein the internal phase volume exceeds 70%. Clearly, for very high internal phase volumes the systems cannot contain discrete spherical oil droplets; rather, they consist of highly distorted oil droplets separated by thin interfacial aqueous films.

Several devices are known for the preparation of HIPR emulsions. Of these devices, some involve a batch preparation procedure, such as those disclosed in U.S. Pat. No. 4,934,398. In addition, the art has typically used mixers that use rotating elements to provide the shear necessary to disperse the internal phase throughout the continuous phase in producing HIPR emulsions. See, e.g., U.S. Pat. Nos. 5,250,576 and 5,827,909. Other methods include those of U.S. Pat. No. 3,684,251, which discloses a series of stacked consecutive-flow mixing chambers of progressively increasing dimensions possessing agitating means for the continuous production of emulsions.

Rotor-stators are frequently used to prepare HIPR emulsions. Although rotor-stators can be operated continuously they are generally designed for use in a single-pass mode. Therefore, the dispersed and continuous phases are fed into the rotor-stator in the ratio required for the final emulsion, e.g., 80% oil and 20% continuous phase. The only way the rotor-stator can disperse this large portion of oil into the much smaller portion of continuous phase is to use very high shear. As the emulsion forms in the rotor-stator unit the high shear rate generates a large amount of heat, which is undesirable for many products, and the high shear rate required to form the emulsion is much higher than what is required to reduce the particle size of the oil droplets in the emulsion. Thus, much of the heat generated in the rotor-stator is unnecessary. In addition, for many emulsions the rotor-stator causes phase inversion by dispersing the continuous phase into the oil phase, which does not result in a final product with desired characteristics. All particle sizes in the present invention refer to average or mean particle size and more specifically to volume-average particle size.

Other means of applying shear that can be more precisely controlled are in-line mixers or static mixers. In such mixers, the fluid flow past fixed elements is divided and recombined by the arrangement of the elements to provide mixing.

Methods have been developed for the continuous production of HIPR emulsions. For example, U.S. Pat. Nos. 4,472, 215 and 4,844,620 disclose processes for the continuous production of HIPR emulsions wherein the phase materials are introduced into a recirculation line in the system.

Methods for making HIPR emulsions consisting of silicone in water are also known in the art. For example, U.S. Pat. Nos. 5,563,189 and 5,665,796 describe a continuous process for making high-internal-phase-ratio emulsions (HIPRE's) consisting of silicone oil in water utilizing high-shear rotor-stators to disperse a high volume of oil in a low volume of water.

It would be desirable to provide a continuous system for forming an HIPR silicone oil-in-water emulsion without prohibitive amounts of mixing energy or emulsifiers, and without causing high temperatures or phase inversion.

SUMMARY OF THE INVENTION

The present invention is directed to continuous methods for forming HIPR emulsions. There is provided a continuous method for preparing a high internal phase silicone in water emulsion which comprises:

a) providing an amount of a continuous phase in a system;

b) adding an amount of a dispersed phase to the system;

c) providing low shear means to mix the continuous phase and dispersed phase thus forming an intermediate emulsion;

d) incrementally adding additional amounts of the dispersed phase to the intermediate emulsion while shearing;

e) maintaining the amounts of continuous phase and dispersed phase in the system by continuously adding additional amounts of each to the system; and, f) removing a high internal phase silicone in water emulsion from the system as it is formed.

As used herein, "soap" refers to the continuous phase used as starting material to form the HIPR emulsions of the present invention and contains both water and at least one emulsifier.

As used herein, the terms "intermediate emulsion" or "grease" are used interchangeably and refer to the emulsion obtained as oil is added to the initial continuous phase in forming the HIPR emulsions of the present invention. The intermediate emulsion acts as continuous phase as additional oil (dispersed phase) is added to form the HIPR emulsion of the present invention.

The HIPR emulsions as prepared are stable and can be diluted with aqueous surfactant solution, fresh water, or saline to produce emulsions possessing high degrees of monodispersity and a desired viscosity without adversely affecting stability. Because the narrow size distribution and droplet size are maintained upon dilution, the resulting emulsion shows little tendency to creaming. This in turn reduces the risk of phase separation.

DETAILED DESCRIPTION OF THE INVENTION

Figure 1:
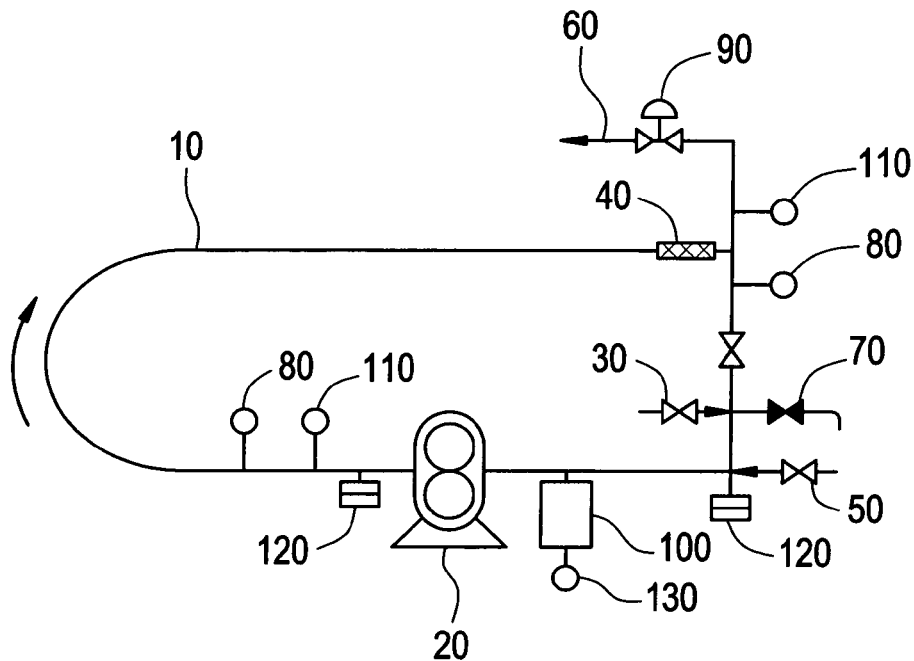
FIG. 1 is a graphical depiction of a recirculation flow line system which may be utilized in accordance with the present invention to form HIPR emulsions.

The invention is an improved process for continuously producing HIPR silicone in water emulsions. The HIPR emulsion produced in accordance with the present invention is in a concentrated form and can be further diluted with water ("diluted emulsion" or "diluted final product") to form a relatively low viscosity oil-in-water emulsion. Most preferably, silicones utilized to form the emulsion include polydimethylsiloxanes, organomodified polydimethylsiloxanes and silica-filled polydimethylsiloxanes.

The methods of the present invention have the technical advantage over prior art rotor-stators in that they can control the ratio of dispersed phase to continuous phase, thus eliminating the potential for inversion of the phases. The methods of the present invention also use much lower shear than rotor-stators that significantly improves the ability to maintain lower processing temperatures.

In accordance with the methods of the present invention, an inversion of phases is avoided by first placing the entire volume of continuous phase in the mixing apparatus or system, and then slowly or incrementally mixing in the dispersed phase. Initially, the continuous phase is a mixture of water and at least one emulsifier, sometimes referred to as "soap". As the small amount of dispersed phase is mixed and dispersed into the larger volume of continuous phase, an intermediate emulsion begins to form. As the intermediate emulsion is formed, the entire volume of the intermediate emulsion acts as the continuous phase, even though it contains some of the dispersed phase. As long as the volume ratio of intermediate emulsion to dispersed phase to be added is kept high, the dispersed phase will continue to easily disperse into the intermediate emulsion. Dispersed phase may thus be continually added to the intermediate emulsion until the desired HIPR emulsion is formed.

In accordance with the present invention, the volume ratio of the continuous phase to the dispersed phase is maintained at a high value at the point at which the two phases are first mixed. As the methods of the present invention are directed to the continuous production of HIPR emulsions, the ratio of the intermediate emulsion (continuous phase and any previously added dispersed phase) to the dispersed phase to be added must similarly be maintained at a high value at the point where the additional dispersed phase is added to the intermediate emulsion. While this ratio of continuous phase or intermediate emulsion to dispersed phase should be, at a minimum, about 1.5:1, this ratio preferably ranges from about 2:1 to about 20:1.

In accordance with the methods of the present invention, low rates of shear are utilized at low processing temperatures. Preferably, the temperature during the methods of the present invention ranges from about 10° C. to about 80° C., more preferably from about 20° C. to about 40° C. Shear rates as low as about 200 sec$^{-1}$ have been used to form the silicone HIPR emulsions. Shear rates in various static mixers were estimated using pressure drop and the correlation between viscosity and shear rate developed experimentally for a shear-thinning silicone HIPR emulsion. This correlation was developed using the pressure drops through tubes of various diameters following the capillary shear diagram technique presented by Brodkey (R. S. Brodkey, *The Phenomena of Fluid Motions*, page 408, Addison-Wesley Publishing Company, Reading, Mass. (1967)). The shear rates calculated and presented in this patent application are approximations for the laminar flow of Newtonian fluids in the various static mixers.

The current invention preferably can be utilized to form oil-in-water emulsions and uses the higher proportion and higher viscosity of the intermediate emulsion, sometimes referred to herein as the "grease", to develop the shear stress required to disperse the additional dispersed phase, i.e., oil, into droplets. Shear stress is equal to the viscosity multiplied by the shear rate, and it is this stress in the continuous phase or intermediate emulsion that is responsible for breaking the oil phase into small droplets. Thus, a high shear stress in the continuous phase may be generated using a relatively low shear rate, such as that created in static mixers. Because of the lower shear rate, relatively little waste heat is generated in accordance with the present invention, so it is easier to control the temperature of the emulsion and it is easy to maintain the oil as the dispersed phase.

Methods known to those skilled in the art may be utilized to produce HIPR emulsions in accordance with preferred embodiments of the present invention. However, preferable processes by which the emulsions may be obtained include a recycled grease recirculation flow line ("RGL") system, a continuous stirred tank ("CST") system, and a staged static mixer ("SSM") system.

In the system utilized in the RGL process, which is generally depicted in FIG. 1, a steady-state condition is obtained where a relatively large flow rate of an intermediate emulsion, or grease, is recycled in a recirculation flow line 10 from the discharge side to the suction side of a pump 20. A relatively small flow rate of oil is fed into the recirculation flow line at oil feed 30 and blended with the higher flow of recycled intermediate emulsion. The shear required to disperse the oil into the intermediate emulsion is provided by a static mixer 40 (or other static shearing device), which is installed in the recirculation flow line. A small flow rate of starting continuous phase, preferably water and at least one emulsifier (also known as "soap"), is also fed into the recirculation flow line at soap feed 50 to maintain the desired product formulation. Downstream of the static mixer, the emulsion continuously exits the recirculation flow line through exit line 60 against a backpressure high enough to ensure that the remaining viscous intermediate emulsion in the recirculation flow line will be forced to the suction side of pump 20. The volume of final emulsion product forced out the exit line 60 is equal to the volume of fresh oil and continuous phase pumped into the recirculation flow line.

The first step in the RGL process is to fill the recirculation flow line 10 with continuous phase. Preferably, the continuous phase is a mixture of water and one or more emulsifiers. The continuous phase may be made continuously by metering the proper formulation of emulsifiers and water into static mixers prior to feeding the RGL. The continuous phase can be cooled or heated by conventional and known means prior to entering the recirculation flow line 10. For each product, the emulsifier to oil ratio will depend upon the formulation of the final product. Once the recirculation flow line 10 is filled with continuous phase, the recycle pump 20 and pump introducing continuous phase (not shown) through soap feed 50 are started up to continuously recycle and mix the continuous phase. An oil feed pump (not shown) is then started and the pump speed increased to the desired steady-state rate. The dispersed phase can be cooled or heated by conventional and known means prior to entering the recirculation flow line 10. Oil enters the system through oil feed 30 and the intermediate emulsion forms as the composition in the recirculation flow line increases in oil, and a steady-state emulsion composition may be quickly obtained.

The water used to make the continuous phase is called the "initial water," and its concentration may have a significant effect on the ultimate emulsion particle size that may be formed. The optimum concentration of initial water in the continuous phase needs to be determined for each product, and may vary with the process.

The oil feed 30 to the recirculation flow line 10 may then be started at a low rate and gradually raised to the final flow rate to give the correct emulsion composition. As the oil feeds into the recycling flow of continuous phase, and later intermediate emulsion, it quickly disperses in the static mixer 40 and forms the intermediate emulsion. A relatively small amount of heat is generated as the viscous intermediate emulsion is sheared while recycling around the recirculation flow line. However, if the temperature increase is greater than desired, the temperature may be lowered by pre-chilling the oil.

To run continuously, the entire recirculation flow line should be under positive pressure to ensure that there exists enough pressure to force intermediate emulsion to the suction side of the recycle pump. This may be accomplished by creating a backpressure on the line where the emulsion exits the recirculation flow line through the use of a backpressure regulator (90 in FIG. 1) or other restrictive device. It may also be beneficial to place a vertical standpipe, an accumulator (100 in FIG. 1) possessing a pressure gauge 130, or a pulse dampener (not shown) at the suction side of the recycle pump. These devices essentially serve as a surge volume under pressure (the recirculation flow line pressure). If the recycle pump begins to cavitate, this pressurized surge volume quickly forces some intermediate emulsion into the suction side of the pump. This avoids cavitation and ensures that the recycle pump will continuously pump the intermediate emulsion around the recirculation flow line. The RGL system also possesses a drain 70 for emptying the system as required for maintenance, thermocouples 80 for measuring temperature, pressure transducers 110 for monitoring the pressure of the system, and rupture discs or similar pressure relief valves 120. These elements can be both within recirculation flow line 10 and exit line 60.

One goal of the RGL process is minimizing the increase in temperature while producing a crude emulsion grease. The increase in temperature may be kept low by minimizing the pressure drop around the recirculation flow line. The pressure drop is a direct measure of the amount of energy being put into the grease through viscous shear. The pressure drop may be kept low by placing a low shear static mixer 40 having a relatively short length with a relatively large inside diameter in the recirculation flow line 10. The static mixer 40 should still provide enough mixing and shear to easily form the intermediate emulsion. The velocity through the static mixer should also be low to reduce pressure drop. Thus, the recycle rate around the recirculation flow line should be low enough to give a low pressure drop, but high enough to easily form an intermediate emulsion. The ratio of recycled intermediate emulsion to oil feed that is required to easily form an emulsion may vary with the desired product.

Figure 2:
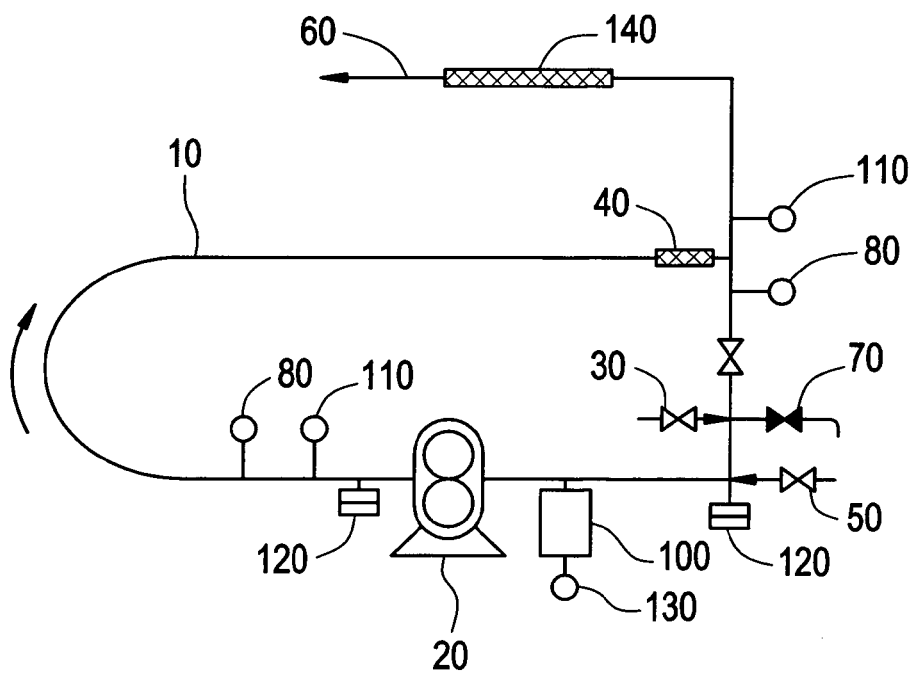
FIG. 2 is a graphical depiction of a modified recirculation flow line system with secondary shearing which may be utilized in accordance with the present invention to form HIPR emulsions.

In a modified system, as depicted in FIG. 2, a secondary static mixing device 140 replaces back-pressure regulator 90 of FIG. 1 in exit line 60 of FIG. 2. In this case, the recycle pump 20 builds the backpressure required for the secondary shearing step.

Figure 3:
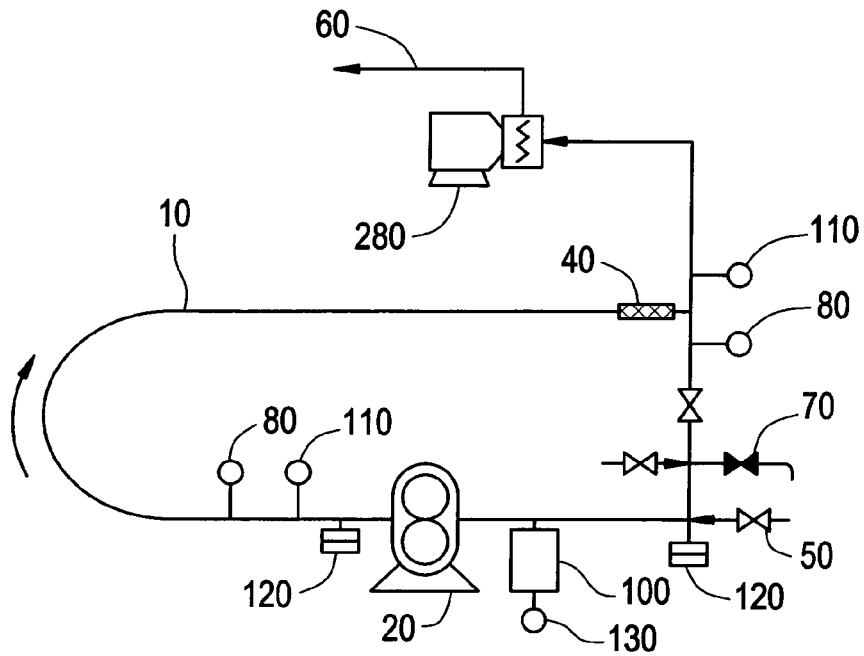
FIG. 3 is a graphical depiction of a modified recirculation flow line system with a rotor stator for secondary shearing which may be utilized in accordance with the present invention to form HIPR emulsions.

As depicted in FIG. 3, where extremely high shear is required to reduce the oil drop size to the ultimate desired value, a rotor-stator 280 of FIG. 3 replaces back-pressure regulator 90 of FIG. 1 in exit line 60 of FIG. 3.

Figure 4:
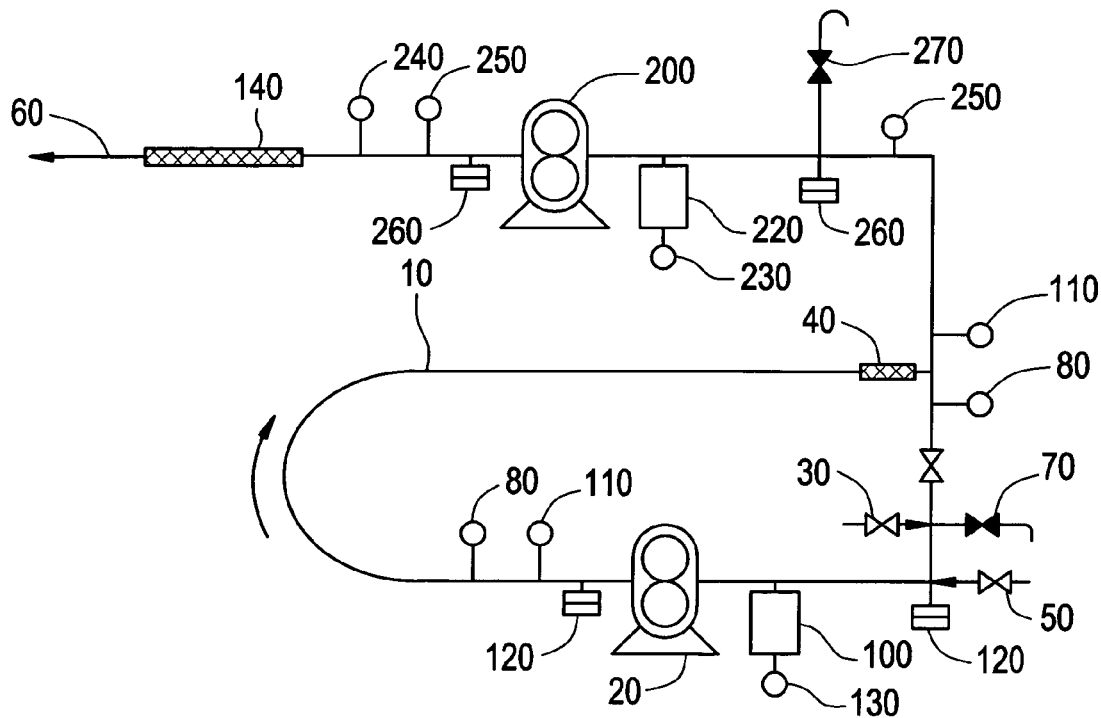
FIG. 4 is a graphical depiction of a modified recirculation flow line system with a pressure-boosting pump which may be utilized in accordance with the present invention to form HIPR emulsions.

In another embodiment, a modified RGL system may be utilized to form an HIPR silicone in water emulsion. A general configuration for this system is depicted in FIG. 4. This system includes booster pump 200 and a secondary static shearing device 140. As set forth in FIG. 4, an additional accumulator 220 with pressure gauge 230 may be placed in exit line 60 upstream of pressure boosting pump 200. Additional thermocouple 240 may be placed in exit line 60 downstream of pressure boosting pump 200, but upstream of secondary static shearing device 140. Additional pressure transducers 250 and rupture discs 260 may be included in exit line 60, as may a vent 270. In one embodiment, the line leading to the booster pump (200 in FIG. 4) for the secondary shearing device (140 in FIG. 4) may be closed off with a valve (not shown) and the continuous phase exiting the recirculation flow line may be collected from a sample valve (not shown).

If the backpressure created by the secondary static shearing device is greater than the pressure ratings of the recycle and feed pumps, then the grease could be fed to a pressure-boosting pump 200 prior to the secondary static shearing device 140. An example of this configuration for the RGL system is given in FIG. 4. Suitable pressure boosting pumps include, but are not limited to, gear pumps commercially available from Zenith, as well as high-pressure diaphragm or piston pumps. Because they use check valves, these pumps are usually not recommended for high viscosity fluids, but since the grease would essentially be forced into the diaphragm or cylinder cavity during the suction stroke, it may be possible that these types of pumps would work properly. The advantage would be that these pumps could have the potential to develop high pressures with much less slippage. If a piston pump could be used to boost the pressure, then it might also be possible to use a high-pressure homogenizer as the secondary shearing step. In such a case, the homogenizing valve serves as the static shearing device. The reason for performing the secondary shearing is to reduce the particle size by passing the grease through a higher shear rate. If a pressure-boosting pump were not used, the backpressure developed by this secondary static shearing device 140 would place the entire recirculation flow line under a significantly higher pressure. If the suction port of the recycle pump were not rated for this high pressure, then a restriction would need to be installed in the suction side of the recirculation flow line to reduce the suction port pressure to an acceptable level. The pressure drop across this restriction is a measure of the amount of shearing being done on the grease. This extra shearing may add heat to the recycle grease, which could be undesirable for some products. If a recycle pump with a high suction pressure rating were used, then the restriction in the suction side of the recirculation flow line would not be needed, and very little heat would be added to the grease.

The RGL system can be set up in various configurations. For example, the soap and oil could be fed into the discharge side of the recycle pump to ensure that the raw materials could never flow backwards in the recirculation flow line and go out the recirculation flow line exit. The disadvantage with this arrangement is that the feed pumps must be rated for a much higher discharge pressure.

Once the crude emulsion is formed in the recirculation flow line, the emulsion sample valve (not shown) is closed and the valve (not shown) to the pressure-boosting pump (200 in FIG. 4) is opened. The exit line 60 upstream of the pressure-boosting pump is allowed to fill with emulsion using a vent valve (270 in FIG. 4). Once this line is full, the vent valve is closed and the pressure-boosting pump is started. The pressure boosting pump speed is controlled to match the flow rate of the emulsion exiting the recirculation flow line 10. Maintaining a relatively large surge volume of emulsion at the suction side of the pressure boosting pump makes it unnecessary to exactly balance the flow rates of the RGL exit emulsion and the pressure boosting pump discharge rate. The surge volume could be maintained with devices such as an accumulator 220, a stand pipe, or a pulse dampener.

The emulsion may be forced through a relatively high shear secondary static shearing device (140 in FIG. 4) on the discharge side of the pressure-boosting pump 200 to break the droplets in the crude emulsion down to the desired particle size. The pressure-boosting pump is required because the flow of emulsion through this static shearing device generates a relatively high backpressure. Since the emulsion passes through this shearing device just once, there is little increase in temperature. The emulsion exits this single-pass static shearing device through exit line 60 ready for dilution with water and additives to produce the final emulsion.

The RGL system may be used to make a wide variety of products because both the ratio of feed oil to recycled intermediate emulsion and the shear rate in the static mixer can be adjusted by changing the pump rate of the recycled intermediate emulsion. In addition, smaller particle sizes may be obtained by increasing the recycle rate (and thus velocity) through the static mixer to give higher shear rates.

Figure 6:
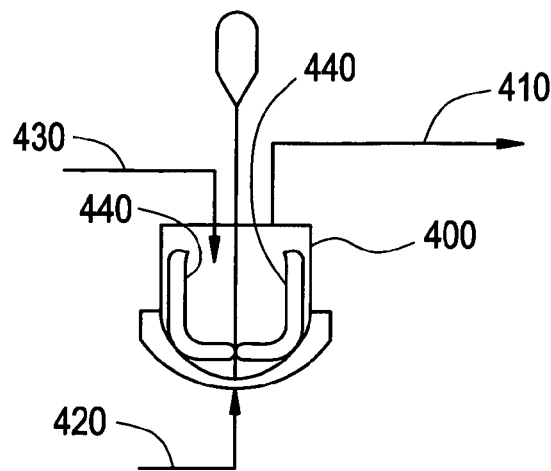
FIG. 6 is a graphical depiction of a continuous stirred tank system which may be utilized in accordance with the present invention to form HIPR emulsions.

In another embodiment, a CST system, which is generally depicted in FIG. 6, is utilized to form the HIPR emulsion. In the CST process, the intermediate emulsion recycles through the mixing pattern in a continuous stirred tank 400 rather than around a recirculation flow line. The continuous stirred tank is a closed pressure vessel, and the product emulsion is forced out an exit line 410 against the backpressure created by the flow of the viscous intermediate emulsion. At steady-state conditions, the relatively small feed rates of oil through line 420 and soap through line 430 are pumped into a relatively large volume of intermediate emulsion in a continuous stirred tank. Both the continuous and dispersed phase can be cooled or heated prior to entering the continuous stirred tank. The agitation rate is high enough to quickly blend and disperse the feed oil into the intermediate emulsion, thus maintaining the high ratio of continuous phase to dispersed phase.

The agitators 440 utilized in the CST 400 may be similar to those known in the art used with dual-shaft batch kettles, and preferably include a wall-wiping anchor (not shown) for backmixing the viscous intermediate emulsion. The wall-wiping anchor agitator may also be capable of dispersing the oil to form an intermediate emulsion with a relatively large particle size. Cooling of the emulsion is enhanced because the viscous intermediate emulsion is continually agitated away from the vessel walls, which act as a cooling surface.

If desired, the intermediate emulsion may be sheared with a high-speed disperser (a second agitator) to form a smaller particle size. At steady-state conditions, the stirred tank is completely full of intermediate emulsion. The startup is done analogously to the RGL process by starting with the continuous stirred tank completely full of continuous phase. The HIPR emulsion is forced out of the CST system through exit line 410 in an amount corresponding to the amount of starting material introduced into the system. Preferably, the CST tank 400 has a jacket adjacent to its external surface which may be utilized for heating or cooling the intermediate emulsion in the tank. Where desired, a secondary static shearing device may be placed in the line carrying the HIPR emulsion out of the CST to further reduce the size of the oil droplets. If the backpressure created by the secondary static shearing device is greater than the pressure rating of the CST, the grease could be fed to a pressure-boosting pump prior to the secondary shearing device.

Figure 7:
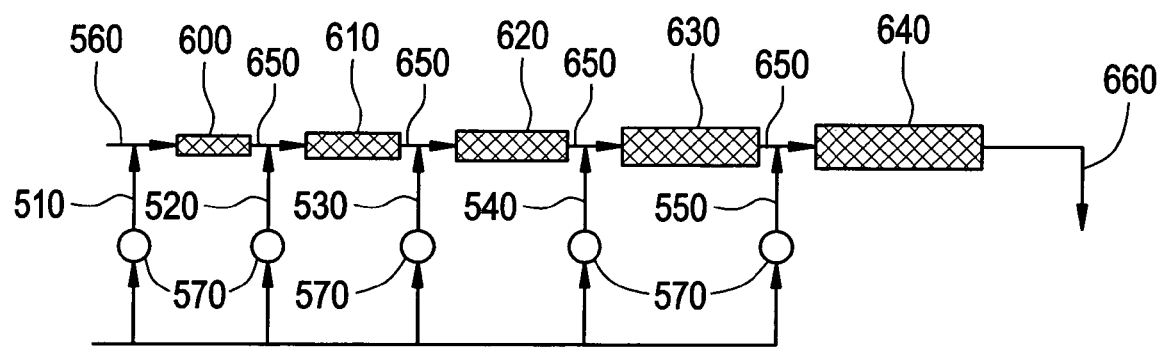
FIG. 7 is a graphical depiction of a staged static mixer system which may be utilized in accordance with the present invention to form HIPR emulsions.

The SSM system, which is generally depicted in FIG. 7, may also be used to form HIPR emulsions in accordance with the methods of the present invention. In the SSM process, the total oil feed rate is divided into several smaller metered feeds through lines 510, 520, 530, 540, 550, each of which possesses a pump 570 (This could also be done with only one oil feed pump using flow control on each metered feed line). The total continuous phase feed rate is introduced through continuous feed line 560 into the first static mixer 600. The smallest oil feed line 510 is also introduced into line 560 just prior to the first static mixer 600. The oil feed rate at feed line 510 is chosen to be low enough to keep the ratio of continuous phase to oil at a relatively high value. This allows the oil to be dispersed easily into the continuous phase as the two feeds are sheared passing through the static mixer 600. The material exiting the static mixer passes to the next static mixer through transporting flow line 650. The material is an intermediate emulsion which acts as the continuous phase feeding the second static mixer 610. Since this intermediate emulsion has a higher flow rate than the continuous phase, a higher flow rate of oil may be fed into the second static mixer at feed 520 while still maintaining the ratio of the continuous phase to the dispersed phase at the desired high value. Additional oil may be added to transporting flow line 650 through feeds 530, 540 and 550 as the intermediate emulsion enters later static mixers 620, 630, 640. Using this technique, the final emulsion may typically be produced by incrementally increasing oil feed rates into four or five staged static mixers in series. Unlike the RGL and CST processes, this staged static mixer process does not involve recycling or backmixing of the grease. The static mixer of each stage can be selected to produce the desired dispersion while minimizing waste energy input (pressure drop). Thus, temperature increase is minimized. After passing through the last static mixer, the finished emulsion leaves the system through exit line 660.

In addition, both the RGL and SSM processes may have one or more of the static shearing devices replaced with some form of agitated in-line mixer (e.g., rotary, impeller, etc.) or rotor-stator. The series of mixers can be in a range of from about 3 to about 10 mixers.

The most important function of the above three processes utilizing the three systems (RGL, CST, and SSM) in connection with the methods of the present invention is that they can form the desired HIPR emulsion with very little potential for phase inversion. In some cases, where it may be impractical to utilize any of these processes to yield the ultimate desired particle (droplet) size, these processes may be utilized to produce an emulsion with a crude particle size. The particle size may then be reduced further using secondary processing techniques with relatively low shear by feeding the crude emulsion through longer or higher shear static shearing devices. Secondary static shearing devices could include static mixers, needle valves, or small-bore tubing.

If the desired secondary static shearing device does not require pressures greater than the pressure limitations of the grease recycle pump, the continuous stirred tank, or the raw material feed pumps, then this secondary static shearing device could be placed on the exit line of the recirculation flow line in the RGL system or the continuous stirred tank in the CST system, or it could be placed at the end of the series of static mixers in the SSM system.

The HIPR silicone emulsions produced in accordance with the present invention are shear-thinning, i.e., pseudoplastic, but they are not thixotropic. Preferably, the HIPR emulsion is treated after removal from the system to obtain the final product having desired properties. This further treatment includes dilution with water. In some embodiments, additional substances are added to produce the final products, e.g., biocidal or preservative agents such as Parasepts or Phenonip, anti-freeze agents such as propylene glycol, thickening agents such as sodium carboxymethylcellulose, etc. Other typical additives for silicone emulsions are given in U.S. Pat. Nos. 5,000,861; 5,391,400; 5,234,495 and 5,338,352. The choice of such additives depends upon the final product and its use. For example, where a silica-filled polydimethylsiloxane is used as the silicone compound, a thickening agent is preferably added.

The viscosity of a HIPR silicone emulsion produced in accordance with the present invention will be in the approximate range of 50,000 cp to 6,000,000 cp everywhere in the system except in the shear zones. The silicone emulsion cannot be observed or sampled in the low viscosity state. Since it always appears to be a highly viscous gel, it is not intuitively obvious that this material can be easily pumped or mixed in any process. This concentrated emulsion can then be diluted to the desired final diluted emulsion product.

The range of viscosity of the final diluted emulsion product may range from about 1 cp to about 10,000 cp. The viscosity varies depending on the silicone used, with a range of about 1 cp to about 2,000 cp where a polydimethylsiloxane or organomodified polydimethylsiloxane is used, while a viscosity of about 5 cp to about 10,000 cp may be obtained where a silica-filled polydimethylsiloxane is used.

The final product possesses mean particle sizes ranging from about 0.1 microns to about 30 microns. The mean particle size can vary, with a range of about 0.1 microns to about 2.0 microns where a polydimethylsiloxane or organomodified polydimethylsiloxane is used, while a mean particle size range of about 1 micron to about 30 microns may be obtained where a silica-filled polydimethylsiloxane is used.

There is a much lower capital cost for the continuous process, which requires small pumps and static mixers, compared with the batch process, which requires large multishaft mixing kettles.

The following examples are illustrative of the present invention and are not intended to limit the scope of the invention as set forth in the appended claims.

EXAMPLES

HIPR silicone in water emulsions were produced in each of the following examples as indicated. The formulations of the HIPR aminopolysiloxane emulsions produced were based on the formulations for the dilute emulsions described in U.S. Pat. Nos. 5,000,861 and 5,391,400 both of which are incorporated by reference herein in their entirety.

Example 1

Figure 5:
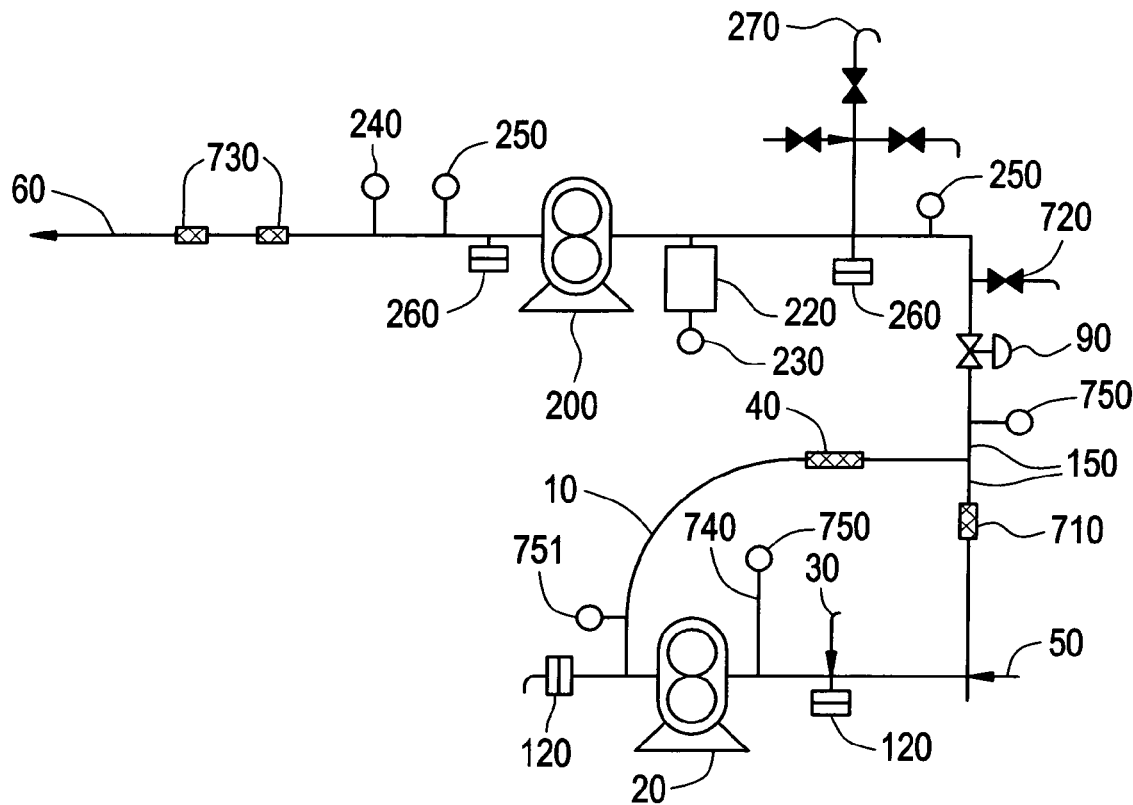
FIG. 5 is a graphical depiction of another modified recirculation flow line system with pressure-boosting pump that may be utilized in accordance with the present invention to form HIPR emulsions.

An aminomodified polydimethylsiloxane (or aminopolysiloxane) emulsion was produced as follows utilizing an RGL apparatus configured as set forth in FIG. 5.

The RGL was assembled using a Zenith BMC 20.2 cc/rev gear pump as the recycle grease pump 20. One-inch stainless steel tubing with a 0.834 inch inside diameter was used for the recirculation flow line 10. The recirculation flow line contained one static mixing assembly 40 prior to the junction with the line 150 feeding the pressure-boosting pump 200 (the recirculation flow line discharge side) and one static mixing assembly 710 downstream of this junction (the recirculation flow line suction side). The pressure-boosting pump was a Zenith BXB-6125-100-01 gear pump. Each static mixing assembly contained three Koch ¾ inch SMX static mixing elements. Each static mixing element was about 0.8 inches long and 0.824 inches in diameter. A vertical standpipe 740 was placed in the recirculation flow line upstream of recycle grease pump 20 and acted analogously to an accumulator. Pressure indicators 750 were placed both within the recirculation flow line 10 and exit line 60.

Continuous phase was continuously fed through soap feed 50 into the suction side of the recirculation flow line. The continuous phase was made by metering 62 grams/minute of a linear alcohol ethoxylate emulsifier (commercially available as Tergitol™ 15-S-15 surfactant (Dow Chemical)), 42 grams/minute of a second emulsifier (commercially available as Tergitol™ 15-S-3 surfactant (Dow Chemical)), and 81 grams/minute of water into a series of static mixers prior to feeding into the recirculation flow line (not shown). The ratio of total emulsifier to oil for this example was about 0.2:1. This composition of initial water was found to result in lower particle sizes than other compositions tested. The ratio of initial water to emulsifier in the present example is about 0.8:1. The continuous phase was recycled around the recirculation flow line, and the organomodified polydimethylsilicone: $(CH_3)_3SiO((CH_3)_2SiO)_{500}((CH_3)(C_3H_6NHC_2H_4NH_2)SiO)_3Si(CH_3)_3$ was then fed through line 30 into the suction side of the recirculation flow line and gradually raised to a steady-state rate of 551 grams/minute. The initial emulsion being made was taken off at a grease sample valve 720 downstream of the exit line backpressure regulator 90. After several minutes, the emulsion composition was roughly lined out at steady-state conditions. This crude intermediate emulsion was then sent to the suction of the pressure-boosting pump.

Once the exit line 60 upstream of the pressure-boosting pump 200 was full, a surge volume was created in accumulator 220 by allowing exit line 60 to pressurize. The bladder in the accumulator was originally pressurized with nitrogen to 125 psi. The exit line 60 was allowed to pressurize to 160 psi, and the pressure-boosting pump was started. Maintaining a pressure between 140 and 220 psi on the pump suction ensured that a sufficient surge volume of emulsion filled the accumulator. The pressure-boosting pump was then controlled to give a relatively constant pressure at some point between this 140 to 220 psi range. A relatively constant suction pressure indicated that the pressure boosting pump rate was essentially equal to the flow rate exiting the recirculation flow line.

The secondary shearing device 730 consisted of two Koflo tube mixers linked together. One tube mixer contained 21 mixing elements and the other contained 27 mixing elements, to give a total of 48 mixing elements. The total length of this static mixing assembly was about 14 inches. The inside diameter of these tubular static mixers was 0.132 inches. The crude grease was pumped through this static mixing assembly at the volumetric throughput rate of about 740 cc/minute. The backpressure generated from the viscous grease passing through this static mixer was 1391 psi, and the particle size produced was 0.168 µm, which was below the acceptable maximum of 0.200 µm for this product.

Efforts were made to minimize the increase in temperature. The oil and continuous phase feeds into the recirculation flow line totaled 736 grams/minute (roughly 740 cc/minute). The recycle pump was set to pump at a rate of 2666 cc/minute. The flow rate of crude emulsion that was forced out of the recirculation flow line into exit 60 toward the pressure boosting pump 200 was equal to the raw material feed rate of 740 cc/minute, and this left 1926 cc/minute of crude emulsion to recycle back to the suction side of the recycle pump.

At the continuous phase feed tee, the recycle emulsion flow rate of 1926 cc/minute combined with the continuous phase feed rate of approximately 190 cc/minute (185 grams/minute) to give a total continuous phase flow rate of about 2116 cc/minute. The continuous phase stream combined with the dispersed phase stream (aminosilicone oil) at the oil feed tee near the suction of the recycle pump. The volumetric feed of the aminosilicone oil was roughly 551 cc/minute (551 grams/minute). These two streams were pumped to the first static mixer assembly where the smaller volume of oil was easily dispersed into the larger volume of emulsion/continuous phase to make a homogeneous crude emulsion.

The pressure at the discharge side of the recycle pump 20 was 200 psi and the pressure downstream of the first static mixer assembly 40 was 180 psi. Most of this 20 psi pressure drop was due to the flow through the static mixer. The second static mixing assembly 710 located on the suction side of the recirculation flow line was installed for the purpose of reducing the pressure on the suction of the recycle pump. The pressure at the recycle suction, 170 psi, was measured on the trapped air pressure in the vertical standpipe 740, which held the pressurized surge volume of emulsion.

Based upon the above, the total pressure drop around the recirculation flow line was only about 30 psi, and relatively little heat was added to the intermediate emulsion. The average temperature of the combined continuous phase and oil feeds was approximately 22° C. The calculated shear rate (for a Newtonian fluid) through the Koch ¾-inch SMX static mixers in the recirculation flow line was approximately 300 sec$^{-1}$.

The crude emulsion exited recirculation flow line into exit line 60 at a tee in the line downstream of the first static mixer. The particle size of this crude emulsion was 1.118 µm. The 180 psi pressure at this exit tee forced 740 cc/minute of crude emulsion to the suction of the pressure-boosting pump where the pressure was recorded as 157 psi. Due to pump slippage, in order to maintain a relatively constant suction pressure and thus balance the flow rates, the pressure-boosting pump was run at a rate of 1410 cc/minute.

The temperature of the grease exiting the discharge of the pressure-boosting pump was 25° C. It was then forced through the 48-element Koflo static mixer assembly 730 to yield the final HIPR emulsion product having 0.168 µm particle size. Due to the pressure drop of 1391 psi, the final product temperature could not exceed 31° C. Reducing the particle size from 1.118 µm to 0.168 µm required a much higher shear rate than that required to form the HIPR emulsion in the recirculation flow line. The calculated shear rate for the throughput rate of 740 cc/minute of grease through the 0.132-inch ID Koflo static mixer was approximately 6,300 sec$^{-1}$ (for a Newtonian fluid).

Example 2

A single-step RGL process (without secondary shearing) was conducted utilizing the same starting materials as Example 1. The concentrations were the same except the ratio of initial water to emulsifiers was about 0.6:1. The feed rate (or throughput rate) was 460 grams/minute (approximately 460 cc/minute). The grease was recycled at 6500 cc/minute through a 0.132-inch ID Koflo static mixer containing 17 mixing elements. This gave a ratio of recycle rate to feed rate of about 14:1. The 6500 cc/minute recycle rate generated a pressure drop of about 1180 psi across the Koflo static mixer. The recycle pump discharge pressure was 1460 psi, the loop exit pressure at the backpressure regulator was 280 psi, and the pressure at the suction of the recycle pump was 260 psi. The grease exiting the recirculation flow line had a mean particle size of 0.149 µm for the same aminopolysiloxane emulsion product in Example 1. The temperature of the grease at the time of sampling was 70° C., although it is estimated the steady-state temperature would have reached about 80° C. The high recycle rate resulted in a very high shear rate, estimated at 56,000 sec$^{-1}$ (for a Newtonian fluid). This example illustrates that a small particle size can be obtained in the simpler single-step RGL process, but the higher recycle rate (thus higher shear rate) required results in much higher temperatures. If this high temperature does not damage the emulsion, the single-step RGL process may be preferable because of its simplicity.

Various modifications may be made to the embodiments disclosed herein. For example, modifications to the apparatus and processing conditions utilized in forming the HIPR emulsion herein may be made to facilitate obtaining the desired final product. Therefore, the above description should not be construed as limiting, but merely as exemplifications of preferred embodiments. Those skilled in the art will envision other modifications within the scope and spirit of the present disclosure.

What is claimed is:

1. A continuous method for preparing a high internal phase ratio silicone in water emulsion which comprises:
    a) providing an amount of a continuous phase in a system;
    b) adding an amount of a dispersed phase to the system;
    c) providing low shear means to mix the continuous phase and dispersed phase thus forming an intermediate emulsion;
    d) incrementally adding additional amounts of the dispersed phase to the intermediate emulsion while shearing, wherein the ratio of intermediate emulsion to the dispersed phase to be added is at least about 1.5 to 1;
    e) maintaining the amounts of continuous phase and dispersed phase in the system by continuously adding additional amounts of each to the system; and,
    f) removing a high internal phase ratio silicone in water emulsion from the system as it is formed wherein the high internal phase silicone in water emulsion has a viscosity of from about 50,000 cp to about 6,000,000 cp.

2. The method of claim 1 wherein the system comprises:
a) at least one pump for continuously introducing components of said continuous phase into a flow line;
b) at least one pump for continuously introducing said dispersed phase into the flow line;
c) means defining a recirculation flow line adapted to receive the phases from the flow line;
d) a recirculating pump positioned in the recirculation flow line;
e) shearing means adapted to emulsify the phases within the recirculation flow line;
f) an outlet adapted to permit a portion of the high internal phase ratio silicone in water emulsion to exit the recirculation flow line while the intermediate emulsion remaining within the recirculation flow line continues to pass therethrough; and,
g) an inlet permitting the intermediate emulsion remaining in the flow line to continue to circulate in the recirculation flow line.

3. The method of claim 2 wherein the shearing means includes at least one static mixer.

4. The method of claim 2 wherein the system includes a means for monitoring the temperature of the intermediate emulsion.

5. The method of claim 2 wherein the system includes a means for monitoring the pressure of the intermediate emulsion.

6. The method of claim 2 wherein the portion of the high internal phase ratio silicone in water emulsion exiting the recirculation flow line through the outlet passes through a line which includes a shearing device for additional shearing of the high internal phase ratio silicone in water emulsion.

7. The method of claim 2 wherein the system includes an accumulator upstream of the recirculation pump.

8. The method of claim 2 wherein the portion of the high internal phase ratio silicone in water emulsion exiting the recirculation flow line through the outlet passes through a line which includes a pressure pump.

9. The method of claim 8 wherein the system includes an accumulator upstream of the pressure pump.

10. The method of claim 1 wherein the continuous phase comprises water and at least one emulsifier.

11. The method of claim 1 wherein the dispersed phase comprises a silicone compound selected from the group consisting of polydimethylsiloxanes, organomodified polydimethylsiloxanes and silica-filled polydimethylsiloxanes.

12. The method of claim 11 wherein the organomodified polydimethylsiloxane is $(CH_3)_3SiO((CH_3)_2SiO)_{500}((CH_3)(C_3H_6NHC_2H_4NH_2)SiO)_3Si(CH_3)_3$.

13. The method of claim 2 wherein water is added to the high internal phase silicone in water emulsion exiting the system to form a diluted final product.

14. The method of claim 13 wherein the diluted final product has mean particle sizes ranging from about 0.1 microns to about 30 microns.

15. The method of claim 13 wherein the diluted final product emulsion has a viscosity ranging from about 1 cp to about 10,000 cp.

16. The method of claim 2 wherein the high internal phase ratio silicone in water emulsion has a temperature ranging from about 10° C. to about 80° C.

17. The method of claim 2 further comprising cooling the dispersed phase prior to entering the flow line.

18. The method of claim 2 further comprising heating the dispersed phase prior to entering the flow line.

19. The method of claim 2 further comprising cooling the continuous phase prior to entering the flow line.

20. The method of claim 2 further comprising heating the continuous phase prior to entering the flow line.

21. The method of claim 1 wherein the system comprises:
a) a closed pressure vessel;
b) at least one pump for continuously introducing said continuous phase into said vessel;
c) at least one pump for continuously introducing said dispersed phase into said vessel;
d) agitators within said vessel capable of producing an intermediate emulsion; and,
e) an outlet adapted to permit a portion of the high internal phase silicone in water emulsion to exit the closed vessel via an exit line while the intermediate emulsion remains within the vessel and is recirculated.

22. The method of claim 21 wherein the agitators of the system further comprise a wall-wiping anchor.

23. The method of claim 21 wherein the system further comprises a second agitator.

24. The method of claim 21 wherein the continuous phase comprises water and at least one emulsifier.

25. The method of claim 21 wherein the dispersed phase comprises a silicone compound selected from the group consisting of polydimethylsiloxanes, organomodified polydimethylsiloxanes and silica-filled polydimethylsiloxanes.

26. The method of claim 25 wherein the organomodified polydimethylsiloxane is $(CH_3)_3SiO((CH_3)_2SiO)_{500}((CH_3)(C_3H_6NHC_2H_4NH_2)SiO)_3Si(CH_3)_3$.

27. The method of claim 21 wherein water is added to the high internal phase silicone in water emulsion exiting the system to form the diluted final product.

28. The method of claim 21 wherein the system includes a shearing device in the exit line for additional shearing of the high internal phase silicone in water emulsion.

29. The method of claim 28 wherein the system includes a pressure pump on the exit line to feed the shearing device.

30. The method of claim 29 wherein the system includes an accumulator upstream of the pressure pump.

31. The method of claim 27 wherein the diluted final product has mean particle sizes ranging from about 0.1 microns to about 30 microns.

32. The method of claim 27 wherein the diluted final product emulsion has a viscosity ranging from about 1 cp to about 10,000 cp.

33. The method of claim 21 wherein the high internal phase silicone in water emulsion has a temperature ranging from about 10° C. to about 80° C.

34. The method of claim 21 further comprising a means for cooling the dispersed phase prior to entering the vessel.

35. The method of claim 21 further comprising a means for heating the dispersed phase prior to entering the vessel.

36. The method of claim 21 further comprising a means for cooling the continuous phase prior to entering the vessel.

37. The method of claim 21 further comprising a means for heating the continuous phase prior to entering the vessel.

38. The method of claim 21 further comprising a jacket around the vessel capable of regulating the intermediate emulsion's temperature.

39. The method of claim 21 wherein the system includes a means for monitoring the temperature of the intermediate emulsion.

40. The method of claim 21 wherein the system includes a means for monitoring the pressure of the intermediate emulsion.

41. The method of claim 1 wherein the system comprises:
a) a series of mixing means;
b) supply means for providing a stream of continuous phase and a separate stream of dispersed phase into a first mixing means to produce an intermediate emulsion;
c) transporting means for forwarding the intermediate emulsion in a transporting flow line to a later mixing means;
d) additional supply means for providing a stream of additional dispersed phase to the intermediate emulsion prior to its entry into the later mixing means; and,
e) repeating steps (c)–(d) as necessary to form the high internal phase silicone in water emulsion.

42. The method of claim 41 wherein the amount of dispersed phase added to the mixing means is incrementally increased with a higher amount of dispersed phase added to a later mixing means in the series of mixing means.

43. The method of claim 41 wherein the series of mixing means includes a mixer selected from the group consisting of in-line static mixers, in-line rotary mixers, in-line impeller mixers, rotor-stators and combinations thereof.

44. The method of claim 43 wherein the series of mixing means comprises about 3 to about 10 mixers.

45. The method of claim 41 wherein at least one pressure pump is placed within the transporting flow line.

46. The method of claim 41 wherein the continuous phase comprises water and at least one emulsifier.

47. The method of claim 41 wherein the dispersed phase comprises a silicone compound selected from the group consisting of polydimethylsiloxanes, organomodified polydimethylsiloxanes and silica-filled polydimethylsiloxanes.

48. The method of claim 47 wherein the organomodified polydimethylsiloxane is $(CH_3)_3SiO((CH_3)_2SiO)_{500}((CH_3)(C_3H_6NHC_2H_4NH_2)SiO)_3Si(CH_3)_3$.

49. The method of claim 41 wherein water is added to the high internal phase silicone in water emulsion exiting the system to form the diluted final product.

50. The method of claim 49 wherein the diluted final product has mean particle sizes ranging from about 0.1 microns to about 30 microns.

51. The method of claim 49 wherein the diluted final product emulsion has a viscosity ranging from about 1 cp to about 10,000 cp.

52. The method of claim 41 wherein the high internal phase silicone in water emulsion has a temperature ranging from about 10° C. to about 80° C.

53. The method of claim 41 further comprising a means for cooling the dispersed phase prior to entering the flow line.

54. The method of claim 41 further comprising a means for heating the dispersed phase prior to entering the flow line.

55. The method of claim 41 further comprising a means for cooling the continuous phase prior to entering the flow line.

56. The method of claim 41 further comprising a means for heating the continuous phase prior to entering the flow line.

57. The method of claim 41 wherein the system includes a means for monitoring the temperature of the intermediate emulsion.

58. The method of claim 41 wherein the system includes a means for monitoring the pressure of the intermediate emulsion.

59. A continuous method for preparing a high internal phase ratio silicone in water emulsion which comprises:
a) providing an amount of a continuous phase in a system;
b) adding an amount of a dispersed phase to the system;
c) providing low shear means to mix the continuous phase and dispersed phase thus forming an intermediate emulsion;
d) incrementally adding additional amounts of the dispersed phase to the intermediate emulsion while shearing,;
e) maintaining the amounts of continuous phase and dispersed phase in the system by continuously adding additional amounts of each to the system; and,
f) removing a high internal phase ratio silicone in water emulsion from the system as it is formed; and wherein the system comprises:
  (i) at least one pump for continuously introducing components of said continuous phase into a flow line;
  (ii) at least one pump for continuously introducing said dispersed phase into the flow line;
  (iii) means defining a recirculation flow line adapted to receive the phases from the flow line;
  (iv) a recirculating pump positioned in the recirculation flow line;
  (v) shearing means adapted to emulsify the phases within the recirculation flow line;
  (vi) an outlet adapted to permit a portion of the high internal phase ratio silicone in water emulsion to exit the recirculation flow line while the intermediate emulsion remaining within the recirculation flow line continues to pass therethrough; and,
  (vii) an inlet permitting the intermediate emulsion remaining in the flow line to continue to circulate in the recirculation flow line;
and further wherein the portion of the high internal phase ratio silicone in water emulsion exiting the recirculation flow line through the outlet passes through a line which includes a shearing device for additional shearing of the high internal phase ratio silicone in water emulsion and a pressure pump.

60. A continuous method for preparing a high internal phase ratio silicone in water emulsion which comprises:
a) providing an amount of a continuous phase in a system;
b) adding an amount of a dispersed phase to the system;
c) providing low shear means to mix the continuous phase and dispersed phase thus forming an intermediate emulsion;
d) incrementally adding additional amounts of the dispersed phase to the intermediate emulsion while shearing,;
e) maintaining the amounts of continuous phase and dispersed phase in the system by continuously adding additional amounts of each to the system; and,
f) removing a high internal phase ratio silicone in water emulsion from the system as it is formed;
wherein the dispersed phase comprises $(CH_3)_3SiO((CH_3)_2SiO)_{500}((CH_3)(C_3H_6NHC_2H_4NH_2)SiO)_3Si(CH_3)_3$.

* * * * *